United States Patent [19]

Vialaron et al.

[11] Patent Number: 4,696,809
[45] Date of Patent: Sep. 29, 1987

[54] PROCESS AND APPARATUS FOR THERMOLYTICALLY DISSOCIATING WATER

[75] Inventors: André Vialaron, Toulouse; Gabriel Olalde; Daniel Gauthier, both of Font Romeu, all of France

[73] Assignee: Centre National de la Recherche Scientifique, Paris, France

[21] Appl. No.: 792,600

[22] Filed: Oct. 29, 1985

[30] Foreign Application Priority Data

Oct. 29, 1984 [FR] France ................. 84 16627

[51] Int. Cl.⁴ .................... C01B 13/00; C01B 3/06; B01J 19/12
[52] U.S. Cl. .................... 423/579; 422/186.3; 204/157.52; 423/648 R
[58] Field of Search ............. 422/186, 186.3; 423/579, 648 R; 204/157.52

[56] References Cited

U.S. PATENT DOCUMENTS

| 3,925,212 | 12/1975 | Tchernev | 422/186 |
| 4,030,890 | 6/1977 | Diggs | 423/648 R |
| 4,053,576 | 10/1977 | Fletcher | 423/648 R |
| 4,233,127 | 11/1980 | Monahan | 423/648 R |
| 4,332,775 | 6/1982 | Genequand et al. | 423/648 R |
| 4,391,793 | 7/1983 | Boese | 423/648 R |
| 4,405,594 | 9/1983 | Pyle | 423/648 R |
| 4,511,450 | 4/1985 | Neefe | 204/157.52 |

OTHER PUBLICATIONS

E. Bilgen and J. Galindo, High Temperature Solar Reactors for Hydrogen Production, Int. J. Hydrogen Energy, vol. 6, No. 2, pp. 139–152, 1981.

Primary Examiner—David L. Lacey
Attorney, Agent, or Firm—Harold H. Dutton, Jr.

[57] ABSTRACT

A process and apparatus for the continuous dissociation of water into hydrogen and oxygen by a thermolytic reaction in contact with a surface (9a) within the reactor immersed in a body (19) of liquid water and heated by an energy input, in particular by focusing solar radiation through a transparent wall (4), so as to maintain the thermolytic temperature at the core of the body of water, whereby a state of boiling is maintained in the immediate vicinity of the surface and generates a gas film near it; the body of water is provided in sufficient quantity to preserve in liquid form the water around that gas film, and within this film the vaporized water molecules are decomposed and in-situ chilling of the decomposition products is assured by the neighboring liquid water.

14 Claims, 3 Drawing Figures

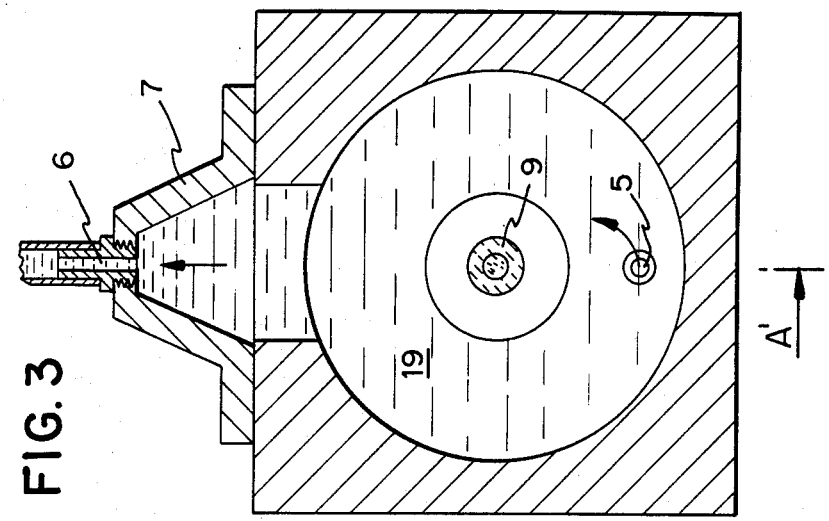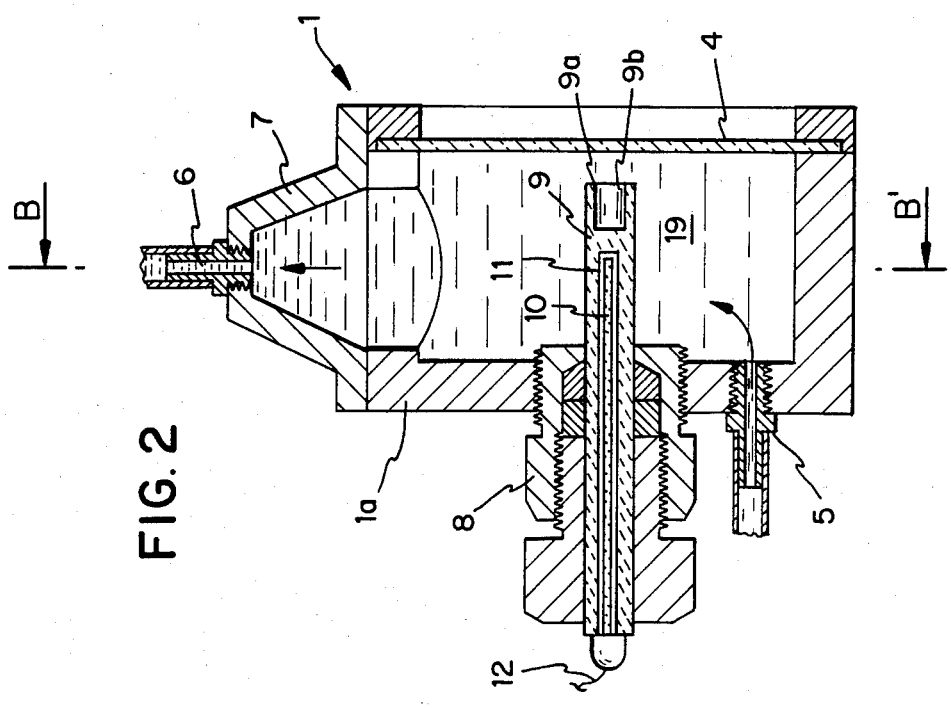

PROCESS AND APPARATUS FOR THERMOLYTICALLY DISSOCIATING WATER

This invention relates to a process and apparatus for the continuous thermolytic dissociation of water into hydrogen and oxygen.

BACKGROUND AND OBJECTS

Much research has been carried out to improve water dissociating methods, there being much interest in producing hydrogen which is an easily stored non-polluting fuel with an inexhaustable raw-material source in the form of water. One way to dissociate water is the direct thermolysis of the water molecule by injecting steam into a reactor containing a refractory body raised to a high temperature (2,000° to 3,000° C.), in particular by focusing solar radiation onto it. As the water molecules make contact with this body, they are essentially dissociated into hydrogen and oxygen at a dissociation rate determined by the operating conditions.

However the implemention of this dissociation approach raises a difficult recovery problem for the high-temperature reaction products. As discussed by the article of E. Bilgen, M. Ducarroir et al in *Int. J. Hydrogen Energy* 2, (1977), pp 251–7, the chemical equilibria operative in the gas phase are such that slow cooling of this gas phase entails reagent recombination until there is total consumption of the products. Two solutions have been considered to overcome this problem.

In a first solution, following the dissociation, the hydrogen contained in the gas phase is separated at high temperature from the gas phase by means of a selective semi-permeable membrane. This method is discussed in the following publications: Iharas, *Int. J. Hydrogen Energy*, 3 (1978), pp 287–96; Fletcher. E & Moen R., *Scienci,* 197 (1977), pp 1050–6; Ounallia,. Cales B., Demrinski K & Baumard J.F., *C.R Acad. Sci.*, 292, series 11 (1981), p 1185; Bilgen E., *Int. J. Hydrogen Energy*, 9, (1984),pp 53–58; U.S. Pat. No. 4,332,775, *Battelle Memorial Institute.*

Such a method however has several drawbacks. In the first place, semi-permeable membrane separation is comparatively slow and a portion of the decomposed gaseous products recombine before diffusing through the membrane, whereby the efficiency is significantly reduced. Further, there is present, before membrane diffusion, a high temperature gas phase in the reactor, including an explosive mixture which under some operational conditions may be dangerous. In particular such a procedure is poorly suited for continuous operation where focused solar radiation is used as the heat source for the refractory body, since the inevitable variations in incident energy entail a notable increase of the danger of explosion.

Another solution for the recovery of the decomposed products comprises rapidly chilling the gaseous mixture issuing from the reactor which then will be at a low temperature. The mixture no longer is reactive and the hydrogen extraction can be carried out by conventional separation means. Chilling may be implemented by injecting cold inert gases into the gaseous mixture, by contact with a cold surface or also by introducing the mixture into a chilling apparatus containing a low-temperature liquid. Information on this solution and its implementing techniques can be found in further detail in the following publications: Lede J., Weber C., Villermaux J., *C.R. Acad. Sci.*, 286 (1978), p 299; Houzelot J.L. & Villermaux C., *Chem. Eng. Sci.*, 32 (1977), 1465; Lapique F., Thesis, Inst. Nat Polytechnique, Nancy (France), 1983.

However this solution requires designing and adding an auxiliary chilling or cooling apparatus whereby the system is rendered substantially more complex and costly while its reliability is reduced. Moreover as regards chilling by cold gases, a gas flow is recovered which is greatly diluted in hydrogen and oxygen (less than 10% hydrogen), and the hydrogen and oxygen therefore are more difficult to isolate. Also, in most cooling equipment, the high-temperature gaseous mixture accumulates the reactor and in conduits upstream of the chilling apparatus, with the above mentioned difficulties (danger of explosion, unsuitability for continuous operation in the case of solar heating).

Accordingly a primary object of the present invention is to overcome these drawbacks of the prior methods and to provide a novel process and a novel apparatus for the dissociation of water by thermolysis.

Another object of the invention is to provide a dissociation process in which the thermolytically decomposed products are cooled and whereby the defects of the known chilling procedures can be overcome.

A further object of the invention is to carry out the chilling inside the very reactor in the immediate vicinity of the heated refractory body under suitable conditions to restrict to a maximum the recombination of the decomposed product and accumulation of the high-temperature reactive gas mixture, without employing an auxiliary chilling apparatus and without causing a gaseous dilution of the decomposed products.

Another object is to provide a dissociation apparatus of extremely simple design and reliable, dangerfree operation.

Another object is to achieve continuous operation with minimal danger, regardless of the heating mode of the refractory body and in particular for the preferred case of focused solar heating.

DESCRIPTION OF THE INVENTION

The dissociation process of this invention is of the type for achieving a thermolytic water reaction upon contact with a refractory body surface raised to a high temperature, called the thermolytic temperature, which is capable of decomposing the water molecule, and then in chilling the decomposition products. In the present invention this process is characterized in that the refractory body surface is immersed in a quantity of liquid water, and the surface thereof is heated by an energy input capable of keeping the core of the body of water at the thermolytic temperature in order to maintain a state of constant boiling in the immediate vicinity of the surface and to assure that there will be at its contact decomposition of the vaporized water molecules. The water in which the refractory-body surface is immersed is present in a sufficient quantity to maintain the water in liquid form around the gas film produced in the vicinity of the surface to assure in-situ chilling of the decomposition products.

In a preferred embodiment, the energy input is provided to refractory-body surface by focusing electromagnetic radiation onto the surface, in particular by focusing solar radiation, so as to apply to this surface an energy density in excess of about 5,000 kilowatt/m$^2$.

Accordingly in the process of the invention the reactor is filled with water in the liquid state, thus simultaneously providing the compound to be dissociated and the chilling agent for the decomposed gases. When the refractory body is raised to a high temperature (>2,000° C.), there appears at its immersed surface a peculiar boiling state called the calefaction state which was studied in 1756 by Leidenfrost J.C. ("De aquae communis non nullis qualitatibus tractatus", Duisburg 1756) and experimentally shown in 1934 by Nukiyama S. (*I. Soc. Mech. Engrs. Japan,* 37 [1934], pp 53–4, 367–74) by immersing an electrically heated element raised to a temperature above the saturation temperature into water.

In the process of the invention, the constant calefaction state set up at the refractory body surface is characterized by the presence of a thin gas film at the surface of the reactor body and the location of an extremely steep temperature gradient, with the vapor and liquid water phases stably coexisting inside the film. Further, there is a substantial drop in the thermal exchange coefficient of the surface to the outside medium (liquid water) with respect to a conventional nucleated boiling state whereby the surface stays stable at high temperature for an energy input of the same order as that required in the conventional, steam-injection thermolytic procedures, and the heat transfer (by radiation and convection) toward the surrounding liquid water stays moderated and allows maintaining this water in liquid form.

The steam molecules of the gas phase undergo dissociation when making contact with the hot refractory body surface, and the uncondensable gases produced by this dissociation (essentially hydrogen and oxygen) are at once chilled merely by moving into the liquid zone surrounding this film.

To permit continuous operation, preferably the reactor water is circulated so as to generate a liquid flow assuring that the decomposition gases will be evacuated in the form of small gas bubbles and that the liquid water will be kept at a stable temperature, and replacing the dissociated water.

The process of the invention combines several important advantages.

The reactor is exceedingly simple and there is an absence of a chilling or cooling apparatus requiring components distinct from the reactor. The operation is highly reliable because the chilling takes place in situ on the decomposition products in the divided state in the form of small bubbles present in the liquid water. Moreover, the efficiency is improved due to the extremely short time interval between water molecule dissociation and chilling of the corresponding decomposition gases, and there is no dilution of the gases produced by the water decomposition.

The invention also provides an apparatus for the implementation of the improved process. This apparatus essentially comprises a reactor containing the liquid water, a refractory body with a surface immersed in the reactor water, heater means capable of keeping the immersed surface at a thermolytic temperature in excess of 2,000° C. and means for evacuating decomposition products in the form of gas bubbles, in the reactor water.

In a preferred embodiment, the heater means include a solar focuser with a condensing factor in excess of 5,000, the refractory-body surface being located in the focal plane of the condenser so as to have a high absorption coefficient. In this case, the reactor preferably comprises a closed cell with a transparent wall located in the path of the radiation flux from the condenser, the refractory body surface being positioned in the reactor near the transparent wall.

The refractory body is selected from a material with good heat-emitting properties (high coefficient of absorption, low thermal conductivity). For the present state of the art, lime-stabilized or yttrium-stabilized zirconia appear to be one of the most suitable refractory substances. To reduce the surface thermal losses, the surface may be provided with a cavity or a plurality of small cavities to better pick up the radiation by means of the cavity effect.

Moreover, the absorption coefficient of refractory bodies as a rule will be higher when these bodies are in the liquid state. According to one feature of the invention, the energy input may be adjusted in such a manner as to melt the refractory body into a thin film at its surface.

The solar focuser can be of any known type, in particular it may be a double reflection heliostat or a single reflection heliostat. In the above mentioned case of a zirconium refractory body, this focuser advantageously may be selected to condense by a factor roughly between 5,000, and 15,000 so as to apply to the immersed surface of the refractory body a radiation flux sufficient to raise its temperature to the thermolytic temperature greater than 2,000° C.

DESCRIPTION OF DRAWINGS

The description below with reference to the accompanying drawings shows in non-limiting manner a dissociation apparatus according to the invention and an implementing example of the process.

FIGS. 2 and 3 are sections of the reactor included in the apparatus and respectively along vertical planes A—A' and B—B'.

DESCRIPTION OF PREFERRED EMBODIMENTS

Figure 1:
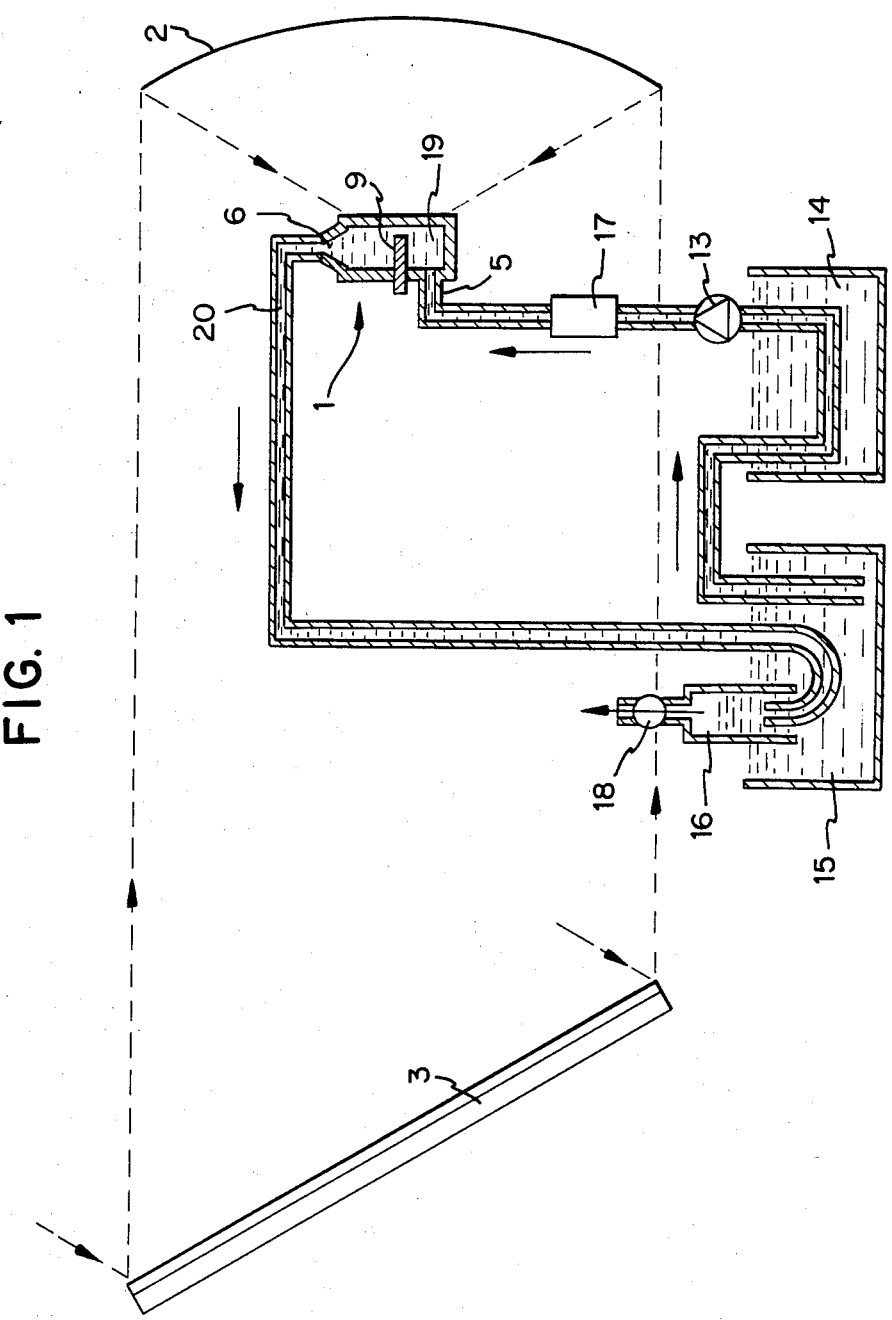
FIG. 1 is a schematic view of this apparatus of the invention.

The illustratively shown apparatus was built and tested at the CNRS Laboratoire d'Energetique Solaire at Odeillo, France. It includes a thermolytic reactor 1 located in the focal plane of a parabolic-type solar focuser 2 receiving the solar radiation from a heliostat 3 comprising plane mirrors forming a reflecting surface; this known-type heliostat is provided with an angular servo system following the sun.

The reactor 1 includes a closed cylindrical cell with a horizontal axis and of which the front wall 4 facing the focuser 2 is made of glass.

This cell is filled with demineralized water 19 and comprises a water intake 5 at its lower portion, crossing its rear wall in the vertical symmetry plane, and an outlet 6 preceded by a neck 7 symmetrically open at the top of the cell with respect to the vertical plane of symmetry.

A double-nut system 8 screwed into the rear wall 1*a* of the reactor holds a zirconia rod 9 and allows positioning it along the cell horizontal axis so that the end face or surface 9*a* of this rod shall be located near the transparent wall 4. To make the zirconia mechanically stronger, lime or yttrium stabilized zirconia is used.

In this example, the front part of the zirconia rod is provided with a cylindrical cavity 9*b* whereby it becomes tubular.

Furthermore, the rod is hollowed at the rear by a channel filled with zirconia powder 10 embedding thermocouples 11 connected by electrical leads 12 to temperature sensing circuit.

Clearly, a reactor such as this in which simultaneously the dissociation reaction of the water molecules and the chilling of the dissociation products take place is indeed a very simple reactor.

The appartaus is complemented by a circulation circuit with an adjustable flow pump 13 supplying the water toward the reactor intake 5, a temperature regulation tank 14 provided with a resistance heater (not shown) and a water reserve tank 15 equipped with a water gas separation jar 16 towards which is moved the water/gas mixture by means of a conduit 20 branched on the reactor outlet 6. The gases collected in the jar 16 are moved toward a conventional hydrogen-extraction device. The apparatus is further complemented by measuring equipment to measure its operational parameters and in particular a liquid flowmeter symbolized by the reference numeral 17 and gas flowmeter symbolized as 18.

This apparatus operates as follows. The demineralized water enters the reactor at intake 5 and causes within this reactor a circulation toward the outlet 6 entraining the gas bubbles formed at the contact of the refractory surface 9a when this surface is at a sufficiently high temperature. The calefraction phenomenon (that is, the phenomenon of forming a thin stable gas film in contact with the front face 9a subjected to the solar flux) is initiated when the flux incident on the surface exceeds an energy density of about 5,000 kw/m$^2$.

The gases produced are entrained by the water flow and carried toward the separation jar 16 where they are recovered.

The parameters of the experimental apparatus that was built, and the test results from one implementation are described below.

EXAMPLE

The zirconia used is lime-stabilized.

| Geometric parameters of the apparatus: | |
|---|---|
| outer diameter of the rod 9 | $8 \times 10^{-3}$ m |
| inside diameter of the inner cavity 9b | $6 \times 10^{-3}$ m |
| area of the heliostat 3 area | 9 m$^2$ |
| diameter of the parabolic focuser 2 | 2 m |
| focal distance | 0.85 m |
| diameter of irradiation focal spot | $10^{-2}$ m |
| focuser aperture angle | 120° |
| optical focusing factor | 12,000 |
| cell and transparent-wall diameter | $6 \times 10^{-2}$ m |
| cell thickness (spacing between its rear and transparent walls) | $3 \times 10^{-2}$ m |
| spacing between front refractory surface 9a and transparent wall | $3 \times 10^{-3}$ m |
| Values for variables: | |
| solar flux density during the test | 980 watt/m$^2$ |
| incident flux density on refractory surface 9a | variable from 8,000 to 11,000 kw/m$^2$ depending on the time of day |
| refractory surface 9a temperature | 2,300 to 2,500° C. |
| circulating water flow rate | 25 liters/h |
| reactor incoming water temperature | 45° C. |

The solar flux was measured with a pyrheliometer. The flux density at the refractory surface was deduced from this measured value. The equilibrium temperature of the refractory surface 9a was deduced from theory (equations of energy balances) and from the temperature indicated by the thermocouples 11 located in the refractory rod to the rear of this surface 9a (the range of values was indicated to take into account of uncertanties due to simplifications in the model).

Test results:

Following a time of operation causing the degassing of the reactor water and the circuit (at least partial elimination of the dissolved oxygen and nitrogen), the ensuing stable operation determined the results below:

uncondensable gas flow: $1.7 \times 10^{-3}$ liter/sec;
hydrogen content, % by volume: 53%;
overall energy efficiency: 1.17%;

In the ideal case, the maximum content of hydrogen which could be obtained in percent by volume is 66%. The percentage actually obtained is less due to the differences in dissolution rates for hydrogen and oxygen in water and due to a complementary degassing of the inert gases dissolved in the water.

The overall energy efficiency is the ratio n=H/E, where H is the enthalpy of formation of one mole of H$_2$O from oxygen and hydrogen, and where E is the solar energy allowing the production of one mole of hydrogen by water dissociation.

This efficiency obtained in the above described experimental apparatus is higher than the efficiencies obtained so far in all thermolytic methods. By optimizing the main system parameters, this efficiency of the invention may be improved significantly further.

In particular, the melting point of zirconia is 2,600° C. and in the above cited experiment, the zirconia surface is solid. Optimizing the heating conditions (in particular reducing conduction losses or increasing the energy input . . .) in order to reach this melting point would result in forming a very thin liquefied zirconia film at the surface of the refractory and this should be substantially improve the efficiency due to the much increased coefficient of absorption for the liquid zirconia compared to the solid zirconia (0.9 and 0.3 respectively). This liquefied zirconia film formation has been observed under certain conditions of solar illumination, however the corresponding measurements have not yet been carried out.

While this invention has been described as having certain preferred features and embodiments, it should be understood that it is capable of still further modifications and variations without departing from the spirit of the invention, and this application is intended to cover without limitation all variations, modifications and adaptions of the invention as fall within the spirit of the invention and the scope of the appended claims.

What is claimed is:

1. A process for continuously dissociating water into hydrogen and oxygen comprising thermolytically reacting the water in contact with a refractory body surface immersed therein and raised to a thermolytic temperature capable of decomposing water molecules, while maintaining said refractory-body surface (9a) immersed in a body of said water (19), and heating said surface by an energy input sufficient to maintain said surface at the thermolytic temperature within said body of water for maintaining a boiling state and vaporizing the water thereby forming a gas film in the immediate vicinity of said surface and for assuring a decomposition of the vaporized water at said immersed surface and producing gaseous hydrogen and oxygen decomposition products, and providing the water in which the refractory body surface is immersed in a sufficient quantity for maintaining the water in liquid form around the gas film produced in the vicinity of said surface for cooling of the decomposition products.

2. A dissociation process in claim 1, and including providing the energy input to the refractory-body surface by focusing electromagnetic radiation onto said surface.

3. A dissociation process as in claim 1, and including providing the energy input to said refractory-body surface by focusing solar radiation capable of providing said surface with an energy density of at least about 5,000 kw/m² onto said surface.

4. A dissociation process as in claim 1 and including providing said energy input to said refractory-body surface at a rate sufficient to raise said surface to a thermolytic temperature greater than 2000° C.

5. A dissociation process as in claim 1 and including providing sufficient energy input to said refractory body so as to obtain a thin molten film on the surface of said refractory body.

6. A dissociation process as in claim 1 and including circulating the water in which said refractory body surface is immersed so as to produce a liquid flow sufficient to assure evacuation of the decomposition products in the form of gas bubbles.

7. An apparatus for the continuous dissociation of water into hydrogen and oxygen, comprising a reactor (1) having a cell filled with liquid water (19), a refractory body (9) having a surface (9a) immersed in the water of the cell, heater means (2,3) capable of maintaining said immersed surface at a thermolytic temperature in excess of 2,000° C. thereby producing gas bubbles of oxygen and hydrogen decomposition products and gas bubble evacuation means (6,20) for evacuating hydrogen and oxygen decomposition products from the cell water.

8. An apparatus as in claim 7, and wherein said reactor (1) comprises a cell containing the liquid water and including a water intake (5) and a water outlet (6,7), said evacuating means including means for circulating the water for producing within the reactor a flow from the intake to the outlet for evacuating the decomposition products.

9. An apparatus as in claim 8, and wherein said outlet (6,7) is located above the refractory surface (9a) and said water intake (5) is located below the refractory surface.

10. An apparatus as in claim 7 wherein said heater means comprises a solar focuser (2) having a condensing factor in excess of 5,000, and wherein the refractory-body surface (9a) is located in the focal plane of said focuser and has a high absorption coefficient.

11. An apparatus as in claim 10, and wherein said refractor (1) includes a transparent wall (4), said refractory-body surface (9a) being located within the reactor near said transparent wall.

12. An apparatus as in claim 10 and wherein said refractory-body surface (9a) includes at least one cavity (9b) for reducing thermal losses by the cavity effect.

13. An apparatus as in claim 10 and wherein said refractory body is made from stabilized zirconia.

14. An apparatus as in claim 13, and whereby said solar focuser (2) has a condensation factor of about 5,000 to 15,000 for feeding to the immersed refractory body surface a radiation flux capable of heating said surface to a thermolytic temperature in excess of 2,000° C.

* * * * *